US012663514B2

(12) United States Patent
Shi

(10) Patent No.: US 12,663,514 B2
(45) Date of Patent: Jun. 23, 2026

(54) LiDAR OCCLUSION DETECTION METHOD AND APPARATUS, STORAGE MEDIUM, AND LiDAR

(71) Applicant: SUTENG INNOVATION TECHNOLOGY CO., LTD., Shenzhen (CN)

(72) Inventor: Zhaohui Shi, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 969 days.

(21) Appl. No.: 17/898,389

(22) Filed: Aug. 29, 2022

(65) Prior Publication Data

US 2023/0067391 A1　　Mar. 2, 2023

(30) Foreign Application Priority Data

Aug. 31, 2021 　(CN) .......................... 202111024603.1

(51) Int. Cl.
*G01S 7/48* 　　　(2006.01)
*G01S 7/487* 　　(2006.01)
*G01S 17/10* 　　(2020.01)

(52) U.S. Cl.
CPC .......... *G01S 7/4802* (2013.01); *G01S 7/4808* (2013.01); *G01S 7/487* (2013.01); *G01S 17/10* (2013.01)

(58) Field of Classification Search
CPC ........... G01S 7/4802; G01S 2007/4975; G02B 27/0006
See application file for complete search history.

(56) References Cited

U.S. PATENT DOCUMENTS

| | | | | |
|---|---|---|---|---|
| 2012/0113410 A1* | 5/2012 | Iwasawa | ................. | G01S 7/497 |
| | | | | 356/5.01 |
| 2020/0142042 A1* | 5/2020 | Hibino | ..................... | G01S 17/42 |
| 2020/0180569 A1* | 6/2020 | Seo | ............................ | B60S 1/56 |
| 2021/0124028 A1* | 4/2021 | Linge | ................. | A63B 24/0062 |
| 2022/0179057 A1* | 6/2022 | Shotan | .................. | G01S 7/4813 |

FOREIGN PATENT DOCUMENTS

| | | |
|---|---|---|
| CN | 111284454 A | 6/2020 |
| CN | 111429400 A | 7/2020 |
| DE | 102019103683 A1 | 8/2019 |
| DE | 102019128559 A1 | 5/2020 |
| EP | 3786664 A1 | 3/2021 |

OTHER PUBLICATIONS

First Office Action issued in related Chinese Application No. 202111024603.1, mailed Aug. 25, 2023, 8 pages.
European Search Report issued in related European Application No. 22192962.3, mailed Jan. 9, 2023, 10 pages.

* cited by examiner

*Primary Examiner* — Yuqing Xiao
*Assistant Examiner* — Zhengqing Qi
(74) *Attorney, Agent, or Firm* — BAYES PLLC

(57) ABSTRACT

The present application discloses a LiDAR occlusion detection method and apparatus, a storage medium, and a LiDAR. The method includes: obtaining detected echo data, obtaining distance information of each point in the echo data, comparing the distance information with a preset distance range, and in response to the distance information being within the preset distance range, determining that the LiDAR is occluded. In the present application, it can be detected in real time whether the LiDAR is occluded, without affecting transmittance of the LiDAR or increasing manufacturing costs of the LiDAR.

4 Claims, 12 Drawing Sheets

S101

Obtain detected echo data

S102

Obtain distance information of each point in the echo data

S103

Compare the distance information with a preset distance range

S104

If the distance information is within the preset distance range, determine that the LiDAR is occluded

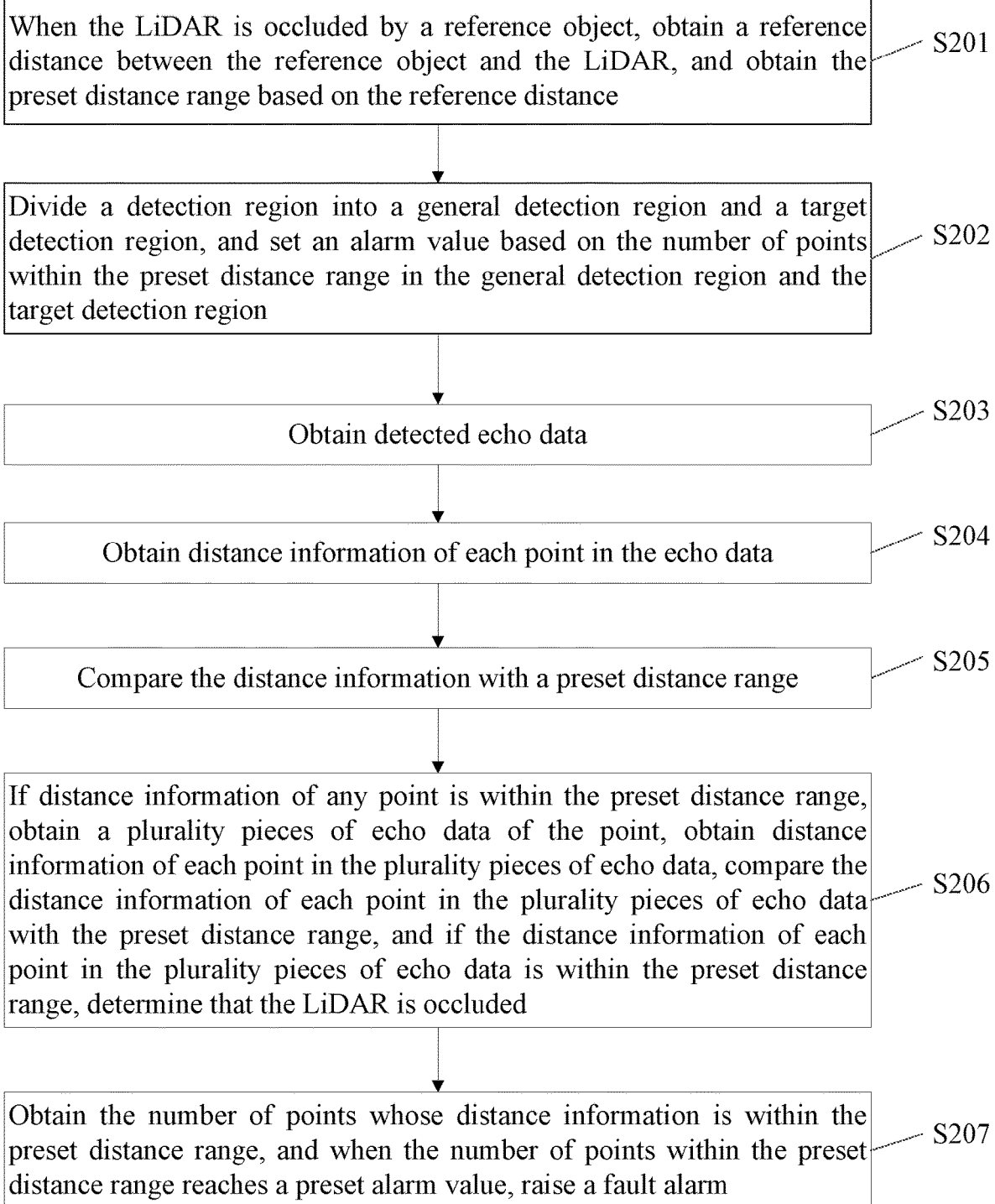

When the LiDAR is occluded by a reference object, obtain a reference distance between the reference object and the LiDAR, and obtain the preset distance range based on the reference distance — S201

Divide a detection region into a general detection region and a target detection region, and set an alarm value based on the number of points within the preset distance range in the general detection region and the target detection region — S202

Obtain detected echo data — S203

Obtain distance information of each point in the echo data — S204

Compare the distance information with a preset distance range — S205

If distance information of any point is within the preset distance range, obtain a plurality pieces of echo data of the point, obtain distance information of each point in the plurality pieces of echo data, compare the distance information of each point in the plurality pieces of echo data with the preset distance range, and if the distance information of each point in the plurality pieces of echo data is within the preset distance range, determine that the LiDAR is occluded — S206

Obtain the number of points whose distance information is within the preset distance range, and when the number of points within the preset distance range reaches a preset alarm value, raise a fault alarm — S207

FIG. 3

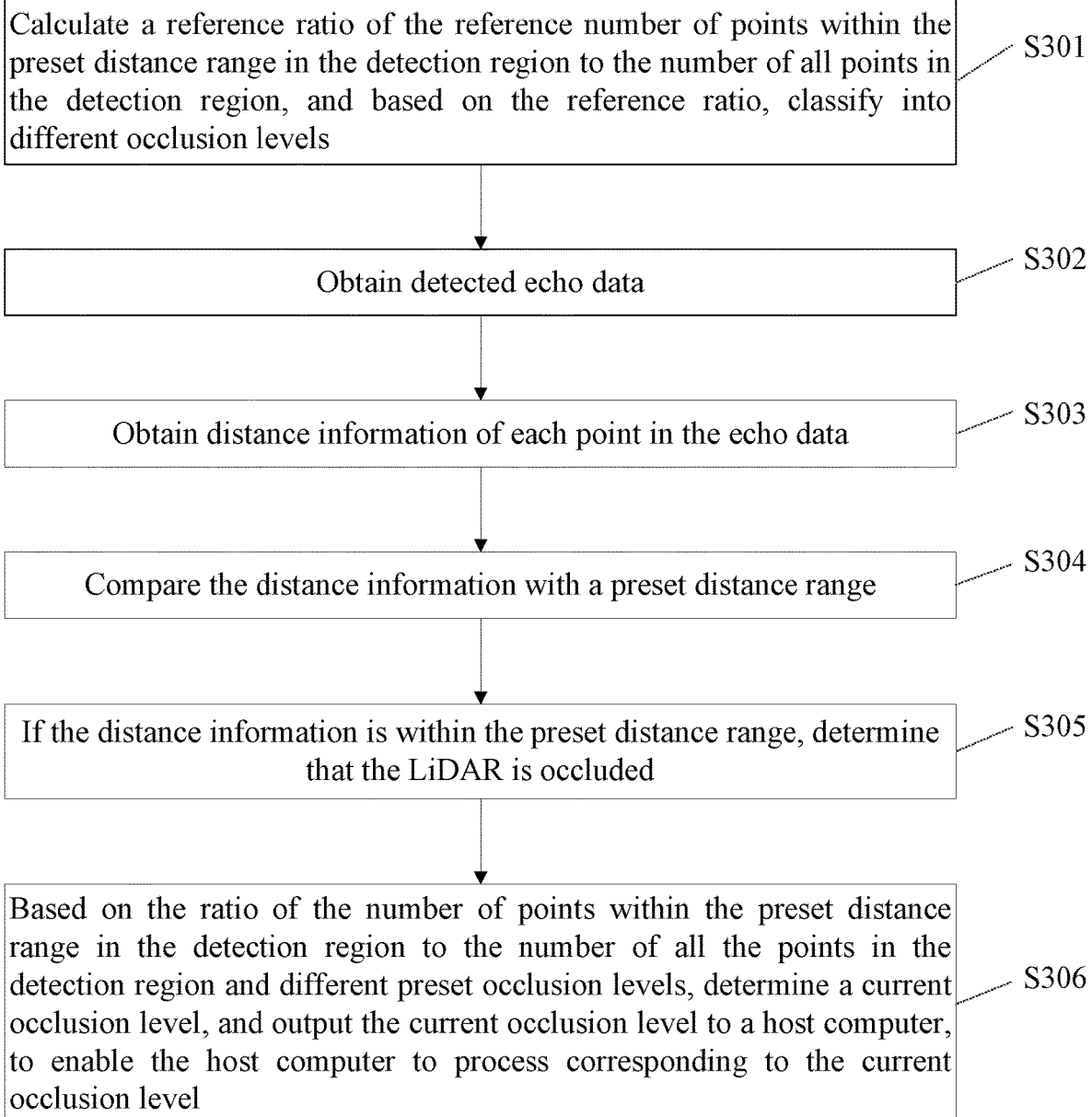

Calculate a reference ratio of the reference number of points within the preset distance range in the detection region to the number of all points in the detection region, and based on the reference ratio, classify into different occlusion levels    S301

Obtain detected echo data    S302

Obtain distance information of each point in the echo data    S303

Compare the distance information with a preset distance range    S304

If the distance information is within the preset distance range, determine that the LiDAR is occluded    S305

Based on the ratio of the number of points within the preset distance range in the detection region to the number of all the points in the detection region and different preset occlusion levels, determine a current occlusion level, and output the current occlusion level to a host computer, to enable the host computer to process corresponding to the current occlusion level    S306

FIG. 4

LiDAR OCCLUSION DETECTION METHOD AND APPARATUS, STORAGE MEDIUM, AND LiDAR

CROSS-REFERENCE TO RELATED APPLICATION

The present application claims the benefit of priority to China Patent Application No. CN202111024603.1, filed on Aug. 31, 2021, the content of which is incorporated herein by reference in its entirety.

TECHNICAL FIELD

The present application relates to the field of computer technologies, and in particular, to a LiDAR occlusion detection method and apparatus, a storage medium, and a LiDAR.

BACKGROUND

The actual use of a LiDAR is usually carried out outdoors. It is unavoidable for the LiDAR to be occluded because of dirt adhesion on the surface of a radome or window, or because of the presence of other objects near the LiDAR. If the LiDAR cannot independently detect the occlusion in a timely manner, it will lead to a loss of detection data and result in reduced detection accuracy. Currently, a pressure sensor, a visual processing unit, or the like is mainly added to commercially available LiDARs to detect the LiDAR occlusion in a timely manner. However, adding the pressure sensor or other sensors will affect transmittance of the radome, and cause a reduction in laser energy, which further affects ranging accuracy of the LiDAR. In addition, adding the visual processing unit will cause an increase in manufacturing cost of the LiDAR.

SUMMARY

Embodiments of the present application provide a LiDAR occlusion detection method and apparatus, a storage medium, and a LiDAR, to detect in real time whether the LiDAR is occluded, without affecting transmittance of the LiDAR or increasing manufacturing costs of the LiDAR. Technical solutions are as follows:

According to a first aspect, an embodiment of the present application provides a LiDAR occlusion detection method, where the method includes:

obtaining detected echo data;

obtaining distance information of each point in the echo data;

comparing the distance information with a preset distance range; and if the distance information is within the preset distance range, determining that the LiDAR is occluded.

According to a second aspect, an embodiment of the present application provides a LiDAR occlusion detection apparatus, where the apparatus includes:

an echo data obtaining module configured to obtain detected echo data;

a distance information obtaining module configured to obtain distance information of each point in the echo data;

a distance comparison module configured to compare the distance information with a preset distance range; and an occlusion determining module configured to determine that the LiDAR is occluded if the distance information is within the preset distance range.

According to a third aspect, an embodiment of the present application provides a computer storage medium, where the computer storage medium stores a plurality of instructions, and the instructions are capable of being loaded by a processor to perform the steps of the forgoing method.

According to a fourth aspect, an embodiment of the present application provides a LiDAR, including a processor and a memory, where the memory stores a computer program, and the computer program is capable of being loaded by the processor to perform the steps of the forgoing method.

The beneficial effects provided by the technical solutions of some embodiments of the present application include at least:

In the embodiments of the present application, the detected echo data is obtained, the distance information of each point in the echo data is obtained, the distance information is compared with the preset distance range, and if the distance information is within the preset distance range, it is determined that the LiDAR is occluded. Provided that the distance information is compared with the preset distance range during normal working of the LiDAR, it can be detected in real time whether the LiDAR is occluded, without affecting transmittance of the LiDAR or increasing manufacturing costs of the LiDAR.

BRIEF DESCRIPTION OF THE DIAGRAMS

To explain embodiments of the present application or the technical solutions more clearly, the following briefly introduces the drawings that need to be used in the embodiments. Obviously, the drawings in the following description are only some embodiments of the present application. The person skilled in the art may obtain other drawings based on these drawings without inventive labor.

FIG. 3 is a schematic flowchart of a LiDAR occlusion detection method according to an embodiment of the present application;

FIG. 4 is a schematic flowchart of a LiDAR occlusion detection method according to an embodiment of the present application;

DETAILED DESCRIPTION

To make objectives, technical solutions and advantages of the present application clearer, embodiments of the present application are described in further detail below with reference to the drawings.

When the following description refers to the drawings, unless otherwise indicated, the same numbers in different drawings indicate the same or similar elements. The implementations described in the following exemplary embodiments do not represent all implementations consistent with the present application. On the contrary, the implementations are merely examples of devices and methods consistent with some aspects of the present application as detailed in the appended claims.

In the description of the present application, it shall be understood that the terms such as "first" and "second" are merely intended for a purpose of description, and shall not be understood as an indication or implication of relative importance. The person skilled in the art can understand specific meanings of the foregoing terms in the present application to a specific situation. In addition, in the descriptions of the present application, "a plurality of" means two or more unless otherwise specified. Herein, "and/or" is an association relationship for describing associated objects and indicates that three relationships may exist. For example, A and/or B may mean the following three cases: only A exists, both A and B exist, and only B exists. The character "/" generally indicates an "or" relationship between the associated objects.

The present application is described in detail below with reference to specific embodiments.

Figure 1:
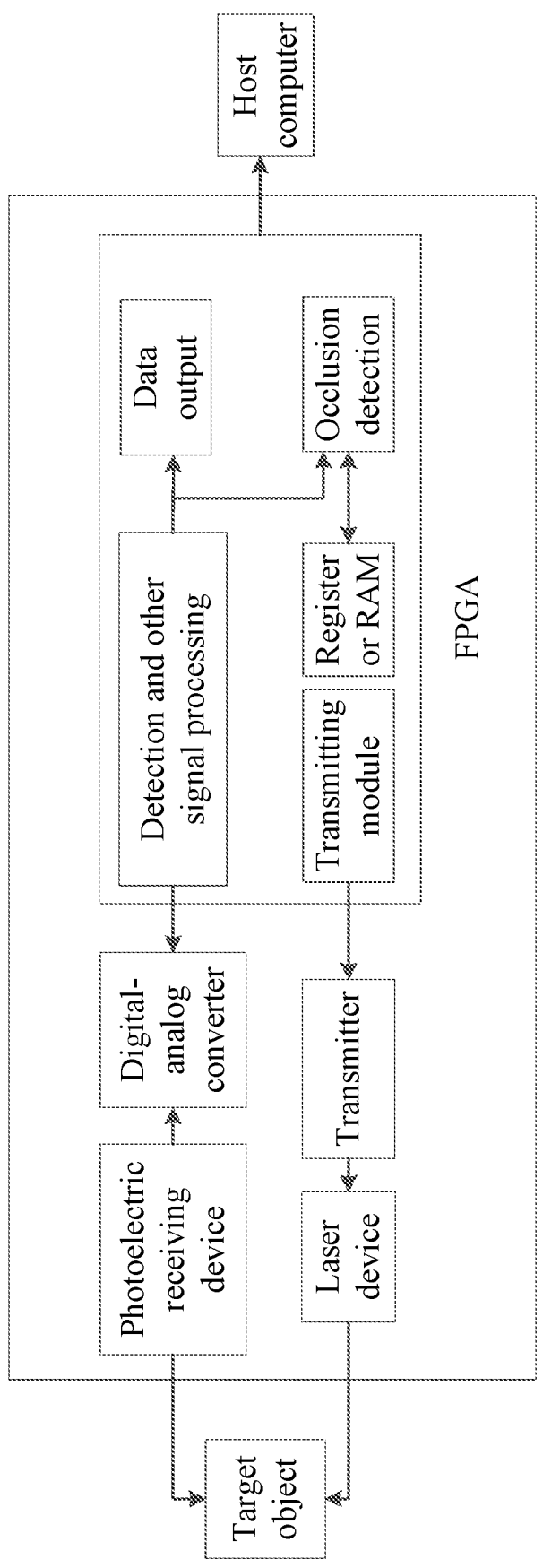
FIG. 1 is a schematic diagram of signal transmission in a LiDAR occlusion detection method according to an embodiment of the present application.

Referring to FIG. 1, FIG. 1 is a schematic diagram of a LiDAR occlusion detection method according to an embodiment of the present application.

The LiDAR obtains echo data after processing an echo signal, and uses the echo data for point cloud output, that is, the LiDAR displays parameters such as azimuth, altitude, speed, attitude, and even shape that are collected by the LiDAR. In addition, the echo data is further used by the LiDAR to detect occlusion. A random access memory (RAM) or a register in a field-programmable gate array (FPGA) of the LiDAR stores a preset distance range. The LiDAR compares distance information of each point in the echo data with the preset distance range, and if the distance information is within the preset distance range, the LiDAR determines that the LiDAR is occluded.

The LiDAR occlusion detection method provided in this embodiment of the present application is described in detail below with reference to FIG. 1 to FIG. 12. The method may be implemented by a computer program, which can run on a LiDAR occlusion detection apparatus based on the Von Neumann architecture. The computer program can be integrated into an application or run as an independent tool application. A LiDAR occlusion detection apparatus in this embodiment of the present application may be any device using the LiDAR occlusion detection method. The device includes but is not limited to a vehicle-mounted device, an airplane, a train, a handheld device, a wearable device, a computing device, or another processing device connected to a wireless modem.

Figure 2:
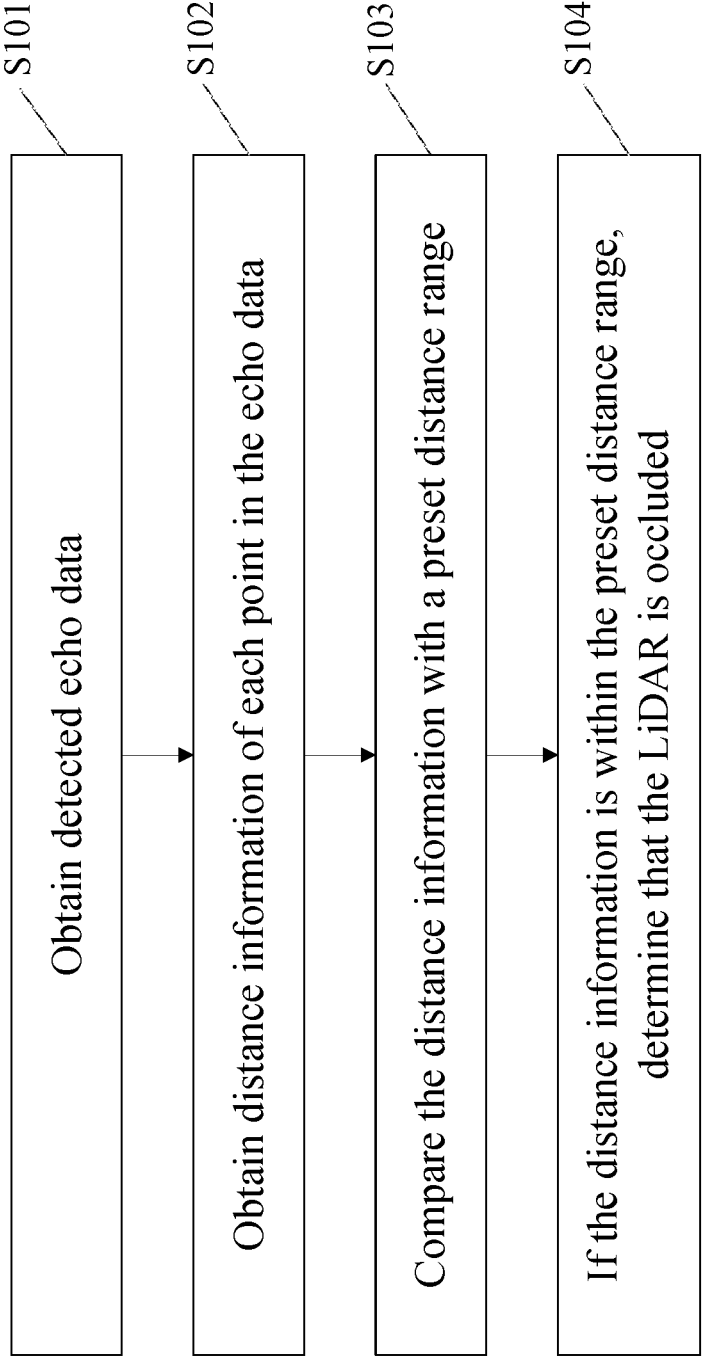
FIG. 2 is a schematic flowchart of a LiDAR occlusion detection method according to an embodiment of the present application.

Referring to FIG. 2, FIG. 2 is a schematic flowchart of a LiDAR occlusion detection method according to an embodiment of the present application.

As shown in FIG. 2, the method in this embodiment of the present application may include the following steps:

S101. Obtain detected echo data.

The echo data refers to an echo signal that is reflected by an object and received by the LiDAR after emitting a detection signal during working. Information about the object or information between the object and the LiDAR may be obtained by comparing and appropriately processing a difference between the echo signal and the detection signal, where the information includes parameters such as distance information, altitude, speed, attitude, and even shape. These parameters are the echo data. The LiDAR obtains the detected echo data, and one piece of echo data is used for point cloud output, while the other piece of echo data is used for occlusion detection.

S102. Obtain distance information of each point in the echo data.

The obtained echo data includes information about a distance between an object receiving the laser and the LiDAR in this case, distance information of each point in the detected echo data is obtained.

In an implementation, an echo data frame of the LiDAR includes 125 columns and 126 rows, which includes 125×126 points. Obtaining the distance information of each point in the echo data can obtain distance information of 125×126 points from echo data after the echo data of 125×126 points is obtained.

S103. Compare the obtained distance information with a preset distance range.

The obtained distance information refers to the distance information of each point in the echo data.

The preset distance range is obtained in the following method. When the LiDAR is occluded by a reference object, the LiDAR obtains the distance information of each point in the echo data, and obtains a calibrated distance range under occlusion by using the distance information of each point in the obtained echo data as a threshold.

The preset distance range is set in the following method. For example, when the LiDAR is occluded by the reference object, obtained distance information of each point in the echo data is 50 meters, and therefore, the preset distance range is 0 to 50 meters. Or for example, when the LiDAR is occluded by the reference object, multiple pieces of distance information of each point in the echo data are obtained, and an average of the multiple pieces of obtained distance information of each point in the echo data is used as a threshold, to obtain the preset distance range. For example, the multiple pieces of obtained distance information of each point in the echo data are specifically 50 meters, 60 meters, and 70 meters, with an average of 60 meters, and therefore, the preset distance range is 0 to 60 meters. The preset distance range is the minimum distance range when the LiDAR is occluded. When the obtained distance information of each point in the echo data is less than or equal to the preset distance range, it indicates that the LiDAR is occluded. The preset distance range is stored in a RAM or a register in FPGA of the LiDAR as shown in FIG. 1 during a LiDAR manufacturing process. Therefore, it is only necessary to extract the preset distance range from the RAM or the register in the FPGA of the LiDAR, invoke the preset distance range when the LiDAR is detected, and compare the preset distance range with the distance information of each point in the echo data.

S104. If the distance information is within the preset distance range, determine that the LiDAR is occluded.

Determine whether the LiDAR is occluded according to whether the distance information is within the preset distance range. If the distance information is within the preset distance range, it indicates that the distance information is less than or equal to the minimum value of the distance range, therefore it is determined that the LiDAR is occluded; or if the distance information is out of the preset distance range, it indicates that the distance information is greater than the minimum value of the distance range, therefore it is determined that the LiDAR is not occluded.

In the embodiments of the present application, the detected echo data is obtained, the distance information of each point in the echo data is obtained, the distance information is compared with the preset distance range, and if the distance information is within the preset distance range, it is determined that the LiDAR is occluded. Provided that the distance information is compared with the preset distance range during the normal working of the LiDAR, it can be detected in real time whether the LiDAR is occluded, without affecting transmittance of the LiDAR or increasing manufacturing costs of the LiDAR.

Referring to FIG. 3, FIG. 3 is a schematic flowchart of a LiDAR occlusion detection method according to an embodiment of the present application. As shown in FIG. 3, the LiDAR detection method may include the following steps:

S201. When the LiDAR is occluded by a reference object, obtain a reference distance between the reference object and the LiDAR, and obtain the preset distance range based on the reference distance.

Reference objects occluding the LiDAR in a natural environment may be common objects with different sizes, shapes, and reflectivities. These common objects, which are used to occlude the LiDAR, include mud, rain, dust, and leaves. The reference object may also be an object having the same reflectivity as the foregoing common obstacles that occlude the LiDAR in a natural environment. For example, an object having the same reflectivity as mud can be found based on the reflectivity of the mud. The object having the same reflectivity as mud may also be used as the reference object. The reference object is attached to a radome or a window of the LiDAR, so that a ranging function of the LiDAR is affected. To occlude the LiDAR with the reference object, any object, such as a finger, an animal, or the like, may be put near the LiDAR, so that the LiDAR is occluded.

A reference distance between the reference object and the LiDAR refers to the distance information of each point in the echo data obtained by the LiDAR during normal working after the reference object is provided.

For example, a ranging range of the LiDAR is obtained when it is not occluded. Then, a reference object is attached to the radome or the window of the LiDAR, or the reference object is put near the LiDAR to obtain the ranging range of the LiDAR when it is occluded, and this ranging range is used as the preset distance range. As for putting a reference object near the LiDAR, the reference object needs to be put within the ranging range of the LiDAR when it is not occluded.

For example, when no reference object is provided, the ranging range of the LiDAR without occlusion is 0 to 200 meters. The mud or the object having the same reflectivity as the mud is attached to the radome or the window of the LiDAR, or the mud or the object having the same reflectivity as the mud is put in a distance range of 0 to 10 meters with the LiDAR as a center. In this case, the minimum distance information in the distance information of each point in echo data of the LiDAR is 10 meters, then 0 to 10 meters is used as the preset distance range.

S202. Divide a detection region into a general detection region and a target detection region, and set an alarm value based on the number of points within the preset distance range in the general detection region and the target detection region.

The target detection region may be a detection region pertaining to a central region in the detection region of the LiDAR, and the general detection region may be a detection region other than the target detection region. It may be understood that the alarm value set for the target detection region needs to be higher than that for the general detection region. For example, an alarm is raised when the number of points whose distance information is within the preset distance range in the target detection region is greater than or equal to m, and an alarm is raised when the number of points whose distance information is within the preset distance range in the general detection region is greater than or equal to n, in is less than n. A specific difference between in and n is set according to user or scenario requirements.

It can be understood that, in some embodiments, the target detection region can also be divided into two or more small target detection sub-regions according to a requirement, and alarm values are separately set for the target detection sub-regions based on specific positions of the target detection sub-regions. The general detection region is divided into two or more small general detection sub-regions, and alarm values are separately set for the general detection sub-regions according to distances between the general detection sub-regions and the target detection region or positions of the general detection sub-regions. Sizes of the target detection sub-regions can be equal or unequal, and this is set according to a specific requirement. Sizes of the general detection sub-regions can be equal or unequal, and this can be set according to a specific requirement. This is not specifically limited in this embodiment.

It can be understood that the alarm values are set for the general detection region and the target detection region respectively, which can improve the accuracy of determining a position of the obstacle, improve the accuracy of occlusion alarm, and improve the efficiency of occlusion processing. Further, the target detection region and the general detection region are further divided, which can further improve the accuracy of determining the position of the obstacle and further improve the efficiency of occlusion processing.

After the reference object is set, the preset distance range is obtained, the LiDAR is then placed under occlusion to obtain detected echo data and the distance information of each point in the echo data. The number of points within the preset distance range in the distance information of each point is determined, and the alarm value is set based on the number of points within the preset distance range.

For example, the preset distance range is 0 to 5 meters, and the reference object is set on the radome or the window of the LiDAR, or is placed in a distance range of 0 to 10 meters away from the LiDAR as a center. In this case, in the distance information of each point in the obtained echo data, 1000 points are within the preset distance range, and therefore, the number 1000 is used as the alarm value.

S203. Obtain detected echo data.

For obtaining the detected echo data, refer to step S101. Details are not described herein again.

S204. Obtain distance information of each point in the echo data.

For obtaining the distance information of each point in the echo data, refer to step S102. Details are not described herein again.

S205. Compare the distance information with a preset distance range.

For comparison between the distance information and the preset distance range, refer to step S103. Details are not described herein again.

S206. If distance information of any point is within the preset distance range, obtain a plurality pieces of echo data of the point, obtain distance information of each point in the plurality pieces of echo data, and compare the distance information of each point in the plurality pieces of echo data with the preset distance range. If the distance information of each point in the plurality pieces of echo data is within the preset distance range, determine that the LiDAR is occluded.

After the first detection, if it is determined that the LiDAR is occluded, it is possible that the LiDAR occlusion is caused by a false triggering of the LiDAR by the radome or the window of the LiDAR, or because the obstacle is removed in a short time. To avoid the false triggering of the LiDAR by the radome or the window of the LiDAR, or to deal with a case that the obstacle is removed in a short time, a region or a position of a point where the LiDAR is occluded is detected multiple times to rule out the LiDAR occlusion caused by the false triggering of the LiDAR by the radome or the window of the LiDAR, or because the obstacle is not removed in a short time.

Therefore, after the distance information of each point in the echo data is obtained, the distance information of each point is compared with the preset distance range, and if the distance information of any point is within the preset distance range, then the multiple pieces of echo data are further obtained for a region or a position in which the point is located. The distance information of each point in the multiple pieces of echo data is obtained, and the distance information of each point in the multiple pieces of echo data is compared with the preset distance range. If the distance information of each point in the multiple pieces of echo data is within the preset distance range, it indicates that multiple pieces of measured distance information of the point is within the minimum distance range with the LiDAR occluded, and therefore, it is determined that the LiDAR is occluded.

The quantity of echo data that is further obtained is not limited herein.

After the distance information of each point in the echo data is obtained, the distance information of each point is compared with the preset distance range, and if distance information of any point is within the preset distance range, then multiple pieces of echo data are further obtained for the point. The distance information of each point in the multiple pieces of echo data is obtained, and the distance information of each point in the multiple pieces of echo data is compared with the preset distance range. If distance information of all points in the multiple pieces of echo data is out of the minimum distance range with the LiDAR occluded or only a preset proportion of the multiple pieces of measured distance information of each point is within the minimum distance range with the LiDAR occluded, it is determined that the LiDAR is not occluded.

For example, only one third of the multiple pieces of measured distance information of each point is within the minimum distance range with the LiDAR occluded, it is determined that the LiDAR is not occluded.

When it is determined that the LiDAR is not occluded, reset code is output to a host computer, and the reset code is used to enable the host computer to stop processing based on the case that the LiDAR is not occluded.

S207. Obtain the number of points whose distance information is within the preset distance range, and when the number of points within the preset distance range reaches a preset alarm value, raise a fault alarm.

Based on the alarm value set in step S202 and the number of points whose distance information is within the preset distance range, when the number of points within the preset distance range reaches the preset alarm value, a fault alarm is raised, and when the host computer receives such fault alarm information, the host computer processes based on such fault alarm information.

In this embodiment of the present application, a preset distance range is set, and an alarm value is set. When the number of points within the preset distance range reaches the preset alarm value, a fault alarm is raised, to enable the host computer to process based on the case that the LiDAR is occluded. Provided that the distance information is compared with the preset distance range during normal working of the LiDAR, it can be detected in real time whether the LiDAR is occluded, without affecting transmittance of the LiDAR or increasing manufacturing cost of the LiDAR.

Referring to FIG. 4, FIG. 4 is a schematic flowchart of a LiDAR detection method according to an embodiment of the present application. As shown in FIG. 4, the LiDAR detection method may include the following steps:

S301. Calculate a reference ratio of the reference number of points within the preset distance range in the detection region to the number of all points in the detection region, and based on the reference ratio, classify different occlusion levels.

The reference object is provided on the radome or the window of the LiDAR or the reference object is put near the LiDAR, and occlusion tests with different occlusion degrees are conducted.

Specifically, after the reference object is provided, the LiDAR obtains the detected echo data, obtains the distance information of each point in the echo data, and compares the distance information with the preset distance range. If distance information of any point is within the preset distance range, calculate the ratio of the reference number of points within the preset distance range in the detection region to the number of all points in the detection region, and classify different occlusion levels based on the ratio of the reference number of points within the preset distance range in the detection region to the number of all the points in the detection region.

In some embodiments, the occlusion levels can be used by the LiDAR to process differently based on different occlusion degrees. The occlusion levels can be non-occlusion, slight occlusion, moderate occlusion, and severe occlusion. Linear interpolation can also be performed at a specific step (such as 10%) from 0 to 100%, to classify multiple occlusion levels.

For example, an echo data frame of the LiDAR is 125-126 points, when the ratio of the reference number of points within the preset distance range in the detection region to the number of all the points in the detection region is 0 to 1/100, the occlusion level is classified as non-occlusion; when the ratio of the reference number of points within the preset distance range in the detection region to the number of all the points in the detection region is 1/100 to 1/10, the occlusion level is classified as slight occlusion; when the ratio of the reference number of points within the preset distance range in the detection region to the number of all the points in the detection region is 1/10 to 1/5, the occlusion level is classified as moderate occlusion; or when the ratio of the reference number of points within the preset distance range in the detection region to the number of all the points in the detection region is 1/5 to 1/2, the occlusion level is classified as severe occlusion.

In some embodiments, calculating the ratio of the reference number of points within the preset distance range in the detection region to the number of all the points in the detection region may mean calculating a ratio of the reference number of points within the preset distance range in the target detection region to the number of all points in the target detection region, or calculating a ratio of the reference number of points within the preset distance range in the general detection region to the number of all points in the general detection region, or calculating a ratio of the reference number of points within the preset distance range in all detection regions to the number of all points in all the detection regions.

S302. Obtain detected echo data.

For obtaining the detected echo data, refer to step S101. Details are not described herein again.

S303. Obtain distance information of each point in the echo data.

For obtaining the distance information of each point in the echo data, refer to step S102. Details are not described herein again.

S304. Compare the distance information with a preset distance range.

For comparison between the distance information and the preset distance range, refer to step S103. Details are not described herein again.

S305. If the distance information is within the preset distance range, determine that the LiDAR is occluded.

For comparison between the distance information and the preset distance range, refer to step S104. Details are not described herein again.

S306. Based on the ratio of the number of points within the preset distance range in the detection region to the number of all the points in the detection region and different preset occlusion levels, determine a current occlusion level, and output the current occlusion level to a host computer, to enable the host computer to process corresponding to the current occlusion level.

In some embodiments, because the detection region is divided into the target detection region and the general detection region, three methods may be used to calculate the ratio of the number of points within the preset distance range in the detection region to the number of all the points in the detection region, which are calculating only a ratio of the number of points within the preset distance range in the target detection region to the number of all points in the target detection region, calculating only a ratio of the number of points within the preset distance range in the general detection region to the number of all points in the general detection region, and calculating a ratio of the number of points within the preset distance range in all detection regions to the number of all points in all the detection regions.

Any one of the three methods for calculating the ratio of the number of points within the preset distance range in the detection region to the number of all the points in the detection region may be used to determine a current occlusion level, and these three methods may be used parallelly or only one of these three methods may be used.

Figure 5:
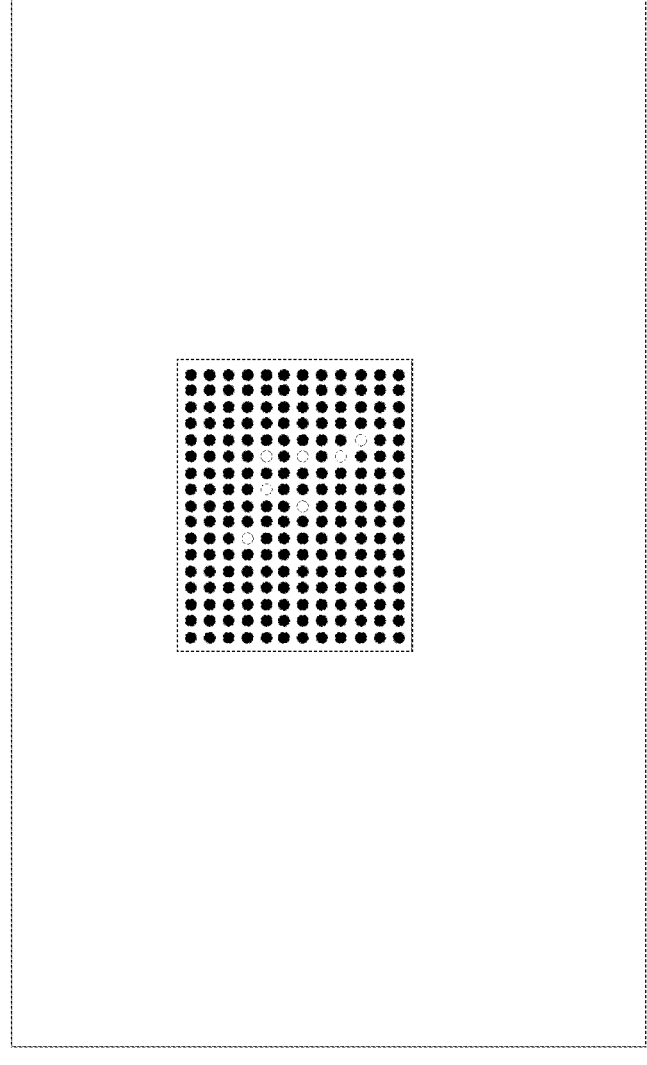
FIG. 5 is a schematic diagram of a target detection field of view of LiDAR according to an embodiment of the present application.

As shown in FIG. 5, FIG. 5 is a schematic diagram of a target detection field of view of a LiDAR A white dotted part in the target detection field of view indicates that distance information of such white dot is within the preset distance range. Calculating the ratio of the number of points within the preset distance range in the target detection region to the number of all points in the target detection region can determine whether the LiDAR is occluded.

Figure 6:
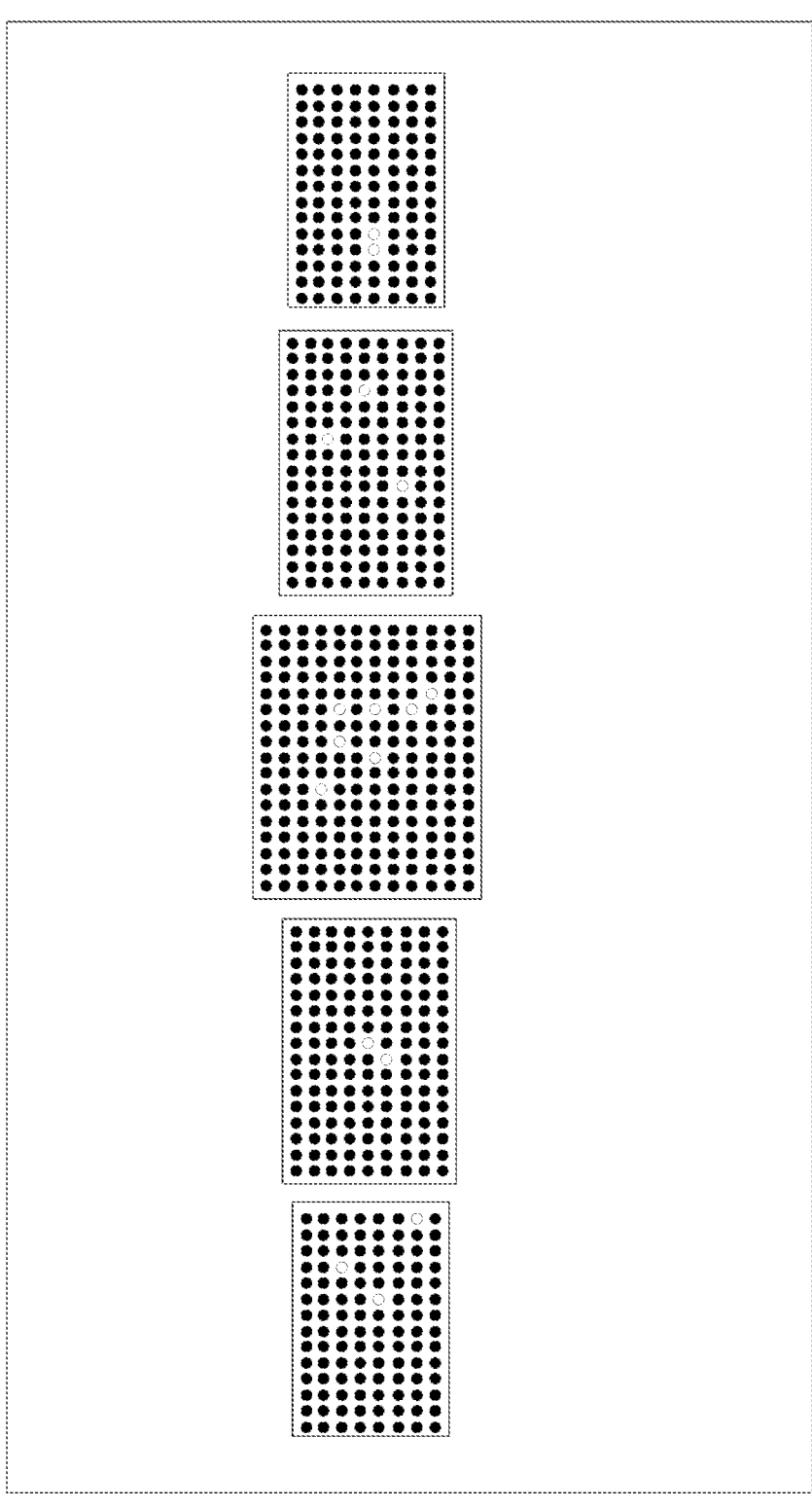
FIG. 6 is a schematic diagram of all detection fields of view of LiDAR according to an embodiment of the present application.

As shown in FIG. 6. FIG. 6 is a schematic diagram of a detection field of view of a LiDAR. There are multiple detection fields of view, including a target detection field of view and a general detection field of view. A white dotted part in the detection field of view indicates that distance information of such white dot is within the preset distance range. Calculating the ratio of the number of points within the preset distance range in all the detection regions to the number of all points in all the detection regions can determine whether the LiDAR is occluded.

The process of classifying occlusion level is detailed in step S301, which is not repeated herein.

For example, an echo data frame of the LiDAR is 125-126 points, when the ratio of the number of points within the preset distance range in all detection regions to the number of all the points in all the detection regions is 0 to 1/100, the occlusion level is classified as non-occlusion; when the ratio of the number of points within the preset distance range in all detection regions to the number of all the points in all the detection regions is 1/100 to 1/10, the occlusion level is classified as slight occlusion; when the ratio of the number of points within the preset distance range in all detection regions to the number of all the points in all the detection regions is 1/10 to 1/5, the occlusion level is classified as moderate occlusion; or when the ratio of the number of points within the preset distance range in all detection regions to the number of all the points in all the detection regions is 1/5 to 1/2, the occlusion level is classified as severe occlusion. If the ratio of the number of points within the preset distance range in all the detection regions to the number of all the points in all the detection regions is calculated to be 1/3, the current occlusion level is classified as severe occlusion. After the current occlusion level is determined as severe occlusion, the current occlusion level is output as severe occlusion to the host computer, to enable the host computer to process according to the current occlusion level as severe occlusion.

In this embodiment of the present application, the ratio of the reference number of points within the preset distance range in the detection region to the number of all the points in the detection region is calculated, and different occlusion levels are classified based on the ratio of the reference number of points within the preset distance range in the detection region to the number of all the points in the detection region. During working, the LiDAR determines a current occlusion level based on the ratio of the number of points within the preset distance range in the detection region to the number of all the points in the detection region and different preset occlusion levels, and outputs the current occlusion level to the host computer, to enable the host computer to process corresponding to the current occlusion level. Provided that the distance information is compared with the preset distance range during normal working of the LiDAR, it can be detected in real time whether the LiDAR is occluded, without affecting transmittance of the LiDAR or increasing manufacturing costs of the LiDAR.

A device embodiment of the present application is provided below, which can be used to perform the method embodiments of the present application. For details not disclosed in this device embodiment of the present application, please refer to the method embodiments of the present application.

Figure 7:
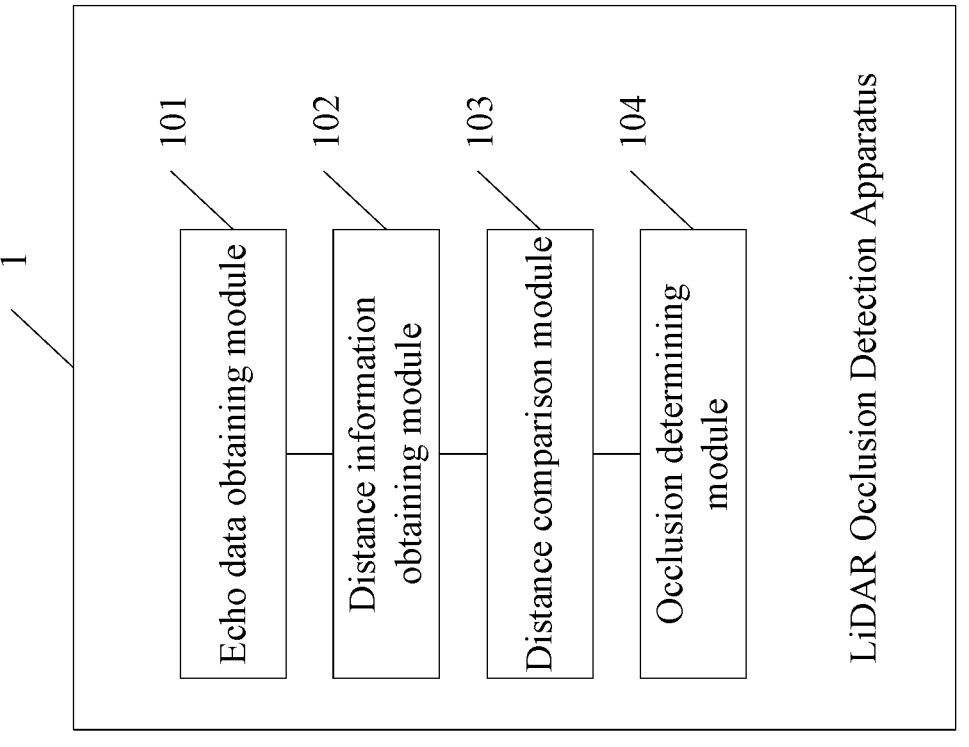
FIG. 7 is a schematic structural diagram of a LiDAR occlusion detection apparatus according to an embodiment of the present application.

Referring to FIG. 7, FIG. 7 is a schematic structural diagram of a LiDAR occlusion detection apparatus according to an exemplary embodiment of the present application.

The LiDAR occlusion detection apparatus can be implemented as all or a part of a terminal through software, hardware, or a combination thereof. The apparatus 1 includes an echo data obtaining module 101, a distance information obtaining module 102, a distance comparison module 103, and an occlusion determining module 104.

The echo data obtaining module 101 is configured to obtain detected echo data.

The distance information obtaining module 102 is configured to obtain distance information of each point in the echo data.

The distance comparison module 103 is configured to compare the distance information with a preset distance range.

The occlusion determining module 104 is configured to: if the distance information is within the preset distance range, determine that the LiDAR is occluded.

Figure 8:
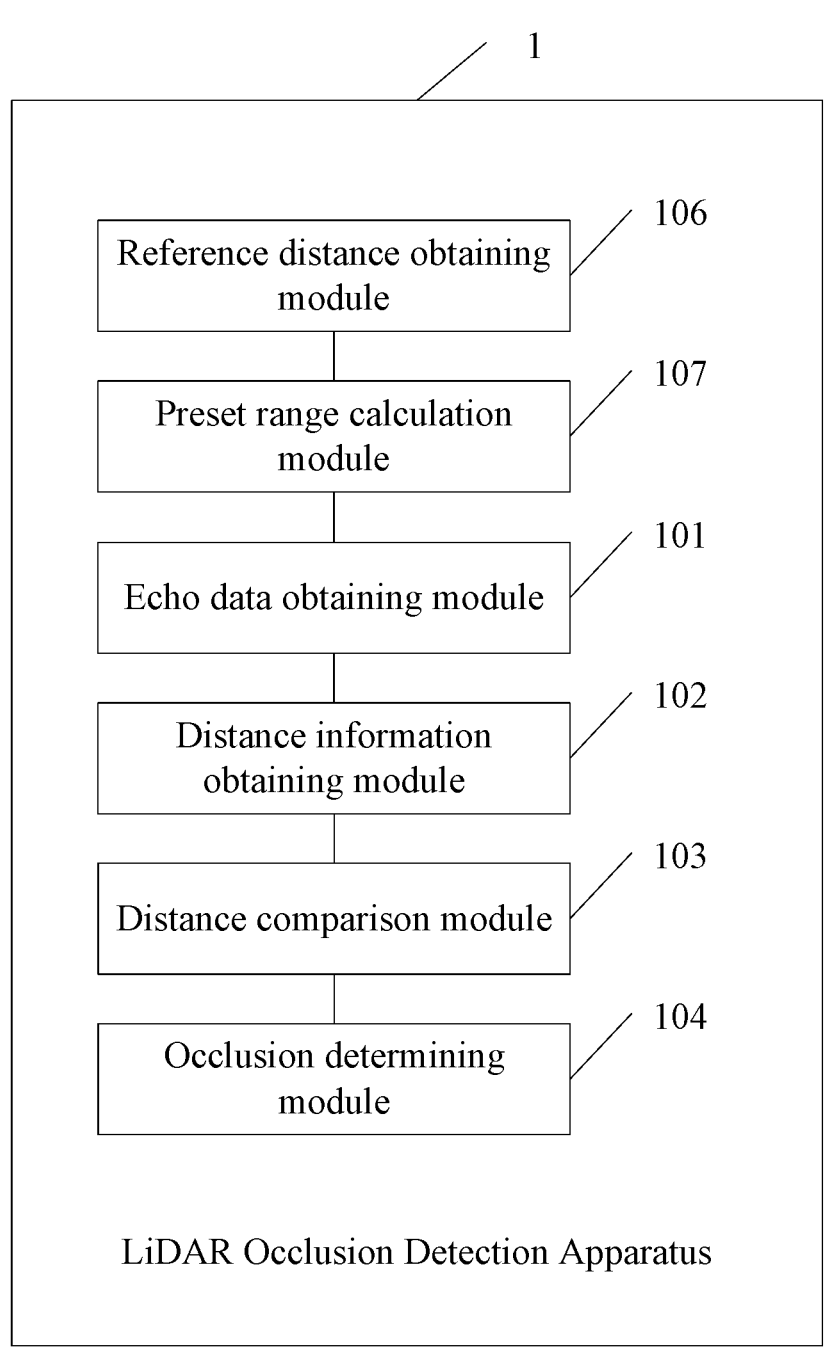
FIG. 8 is a schematic structural diagram of a LiDAR occlusion detection apparatus according to an embodiment of the present application.

As shown in FIG. 8, the apparatus 1 may further include:

a reference distance obtaining module 105, configured to: when the LiDAR is occluded by a reference object, obtain a reference distance between the reference object and the LiDAR; and a preset range calculation module 106, configured to obtain the preset distance range based on the reference distance.

Figure 9:
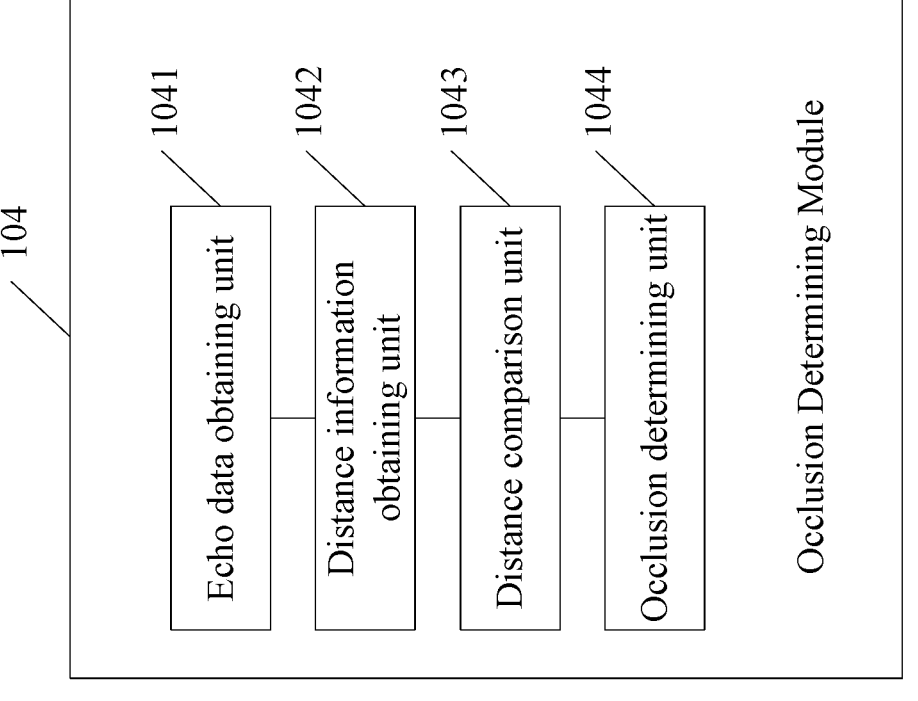
FIG. 9 is a schematic structural diagram of an occlusion determining module according to an embodiment of the present application.

As shown in FIG. 9, the occlusion determining module 104 may include:

an echo data obtaining unit 1041, configured to: if distance information of any point is within the preset distance range, obtain a plurality pieces of echo data of the point;

a distance information obtaining unit 1042, configured to obtain distance information of each point in the plurality pieces of echo data;

a distance comparison unit 1043, configured to compare the distance information of each point in the plurality pieces of echo data with the preset distance range; and an occlusion determining unit 1044, configured to: if the distance information of each point in the plurality pieces of echo data is within the preset distance range, determine that the LiDAR is occluded.

Figure 10:
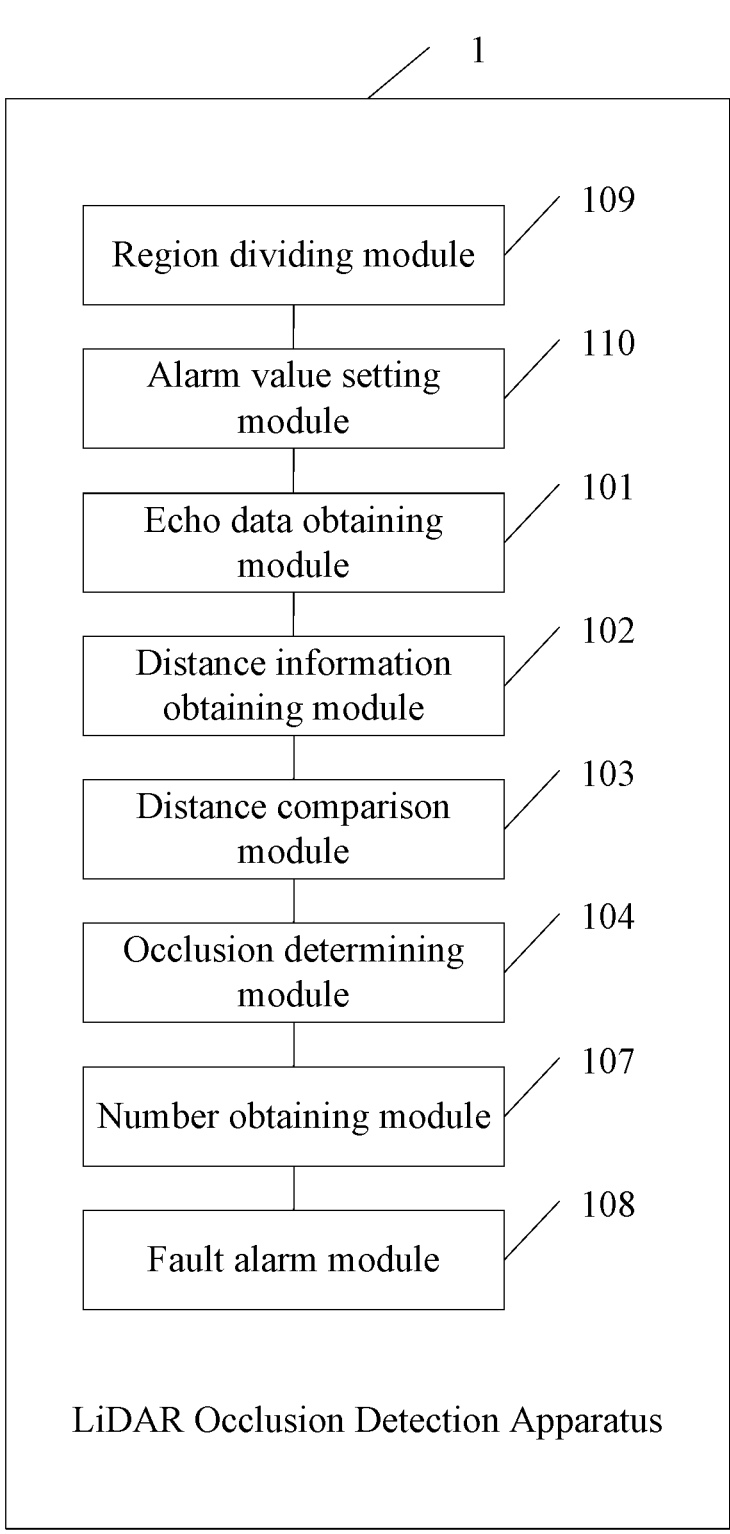
FIG. 10 is a schematic structural diagram of a LiDAR occlusion detection apparatus according to an embodiment of the present application.

As shown in FIG. 10, the apparatus 1 may further include:

a number obtaining module 107, configured to obtain the number of points whose distance information is within the preset distance range; and a fault alarm module 108, configured to: when the number of points within the preset distance range reaches a preset alarm value, raise a fault alarm.

As shown in FIG. 10, the apparatus 1 may further include:

a region dividing module 109, configured to divide a detection region into a general detection region and a target detection region; and an alarm value setting module 110, configured to set the alarm value based on the number of points within the preset distance range in the general detection region and the target detection region.

Figure 11:
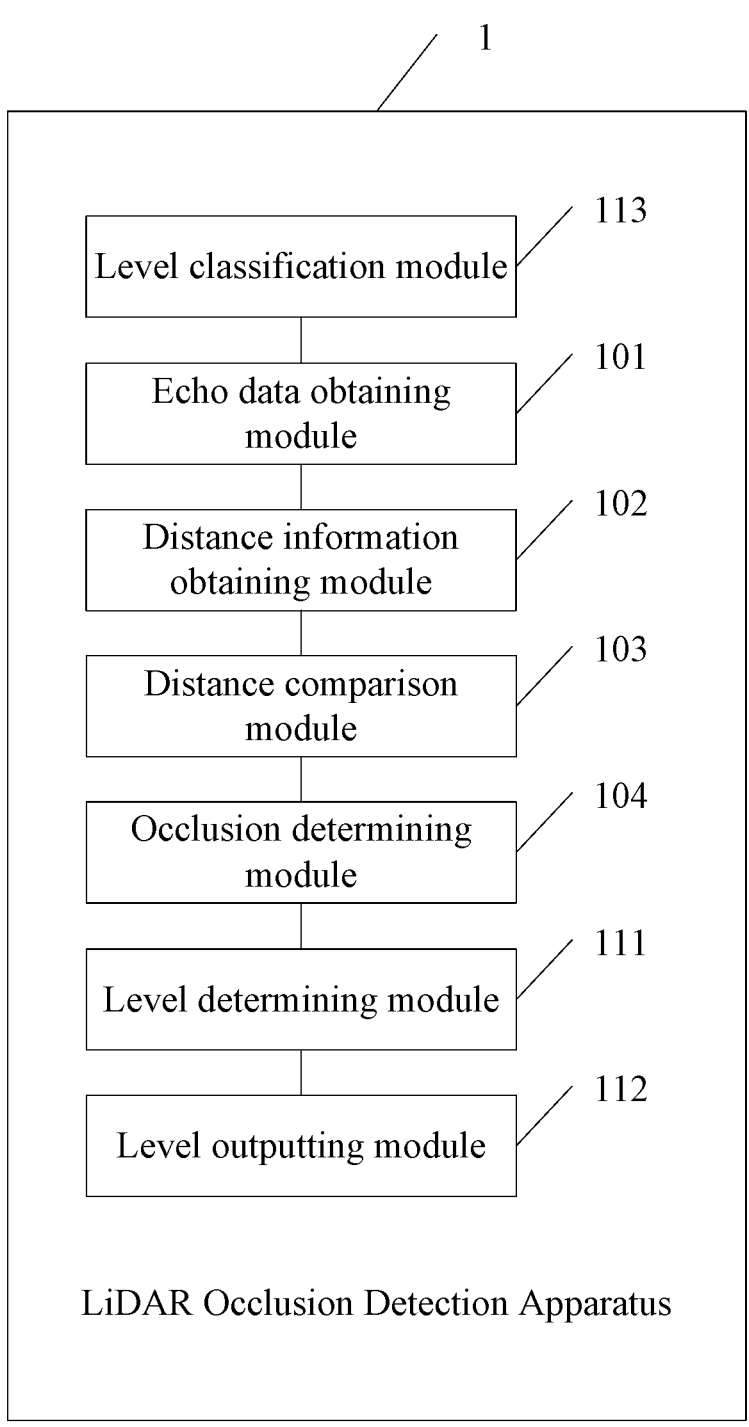
FIG. 11 is a schematic structural diagram of a LiDAR occlusion detection apparatus according to an embodiment of the present application.

As shown in FIG. 11, the apparatus 1 may further include:

a level determining module 111, configured to calculate a ratio of the number of points within the preset distance range in the detection region to the number of all points in the detection region, and based on the ratio and different preset occlusion levels, determine a current occlusion level; and a level outputting module 112, configured to output the current occlusion level to a host computer, to enable the host computer to process corresponding to the current occlusion level.

As shown in FIG. 11, the apparatus 1 may further include:

a level classification module 113, configured to: calculate a reference ratio of the reference number of points within the preset distance range in the detection region to the number of all points in the detection region, and based on the reference ratio, classify into different occlusion levels.

In some embodiments, the level determining module 111 is configured to:

calculate a ratio of the number of points within the preset distance range in the target detection region to the number of all points in the target detection region; or calculate a ratio of the number of points within the preset distance range in the general detection region to the number of all points in the general detection region; or calculate a ratio of the number of points within the preset distance range in all detection regions to the number of all points in all the detection regions.

In this embodiment of the present application, a preset distance range is set, and an alarm value is set. When the number of points within the preset distance range reaches the preset alarm value, a fault alarm is raised, to enable the host computer to process based on the case that the LiDAR is occluded. The ratio of the reference number of points within the preset distance range in the detection region to the number of all the points in the detection region is calculated, and different occlusion levels are classified based on the ratio of the reference number of points within the preset distance range in the detection region to the number of all the points in the detection region. During working, the LiDAR determines a current occlusion level based on the ratio of the number of points within the preset distance range in the detection region to the number of all the points in the detection region and different preset occlusion levels, and outputs the current occlusion level to the host computer, to enable the host computer to process corresponding to the current occlusion level. Provided that the distance information is compared with the preset distance range during normal working of the LiDAR, it can be detected in real time whether the LiDAR is occluded, without affecting transmittance of the LiDAR or increasing manufacturing costs of the LiDAR.

It should be noted that, when the LiDAR occlusion detection apparatus performs the LiDAR occlusion detection method, division of the foregoing functional modules is used as an example for illustration. In actual application, the foregoing functions can be allocated to different functional modules as required. That is, an inner structure of the device is divided into different functional modules to implement all or some of the functions described above. In addition, embodiments of the LiDAR occlusion detection apparatus and the LiDAR occlusion detection method provided above pertain to a same concept. For a specific implementation process, refer to the method embodiments. Details are not described herein again.

Serial numbers of the embodiments of the present application are only intended for description, and do not indicate advantages or disadvantages of the embodiments.

An embodiment of the present application also provides a computer storage medium. The computer storage medium may store a plurality of instructions. The instructions are capable of being executed by a processor to perform the steps of the method in the embodiments shown in FIG. 2 to FIG. 6. For a specific execution process, refer to the specific description of the embodiments shown in FIG. 2 to FIG. 6. Details are not described herein again.

The present application further provides a LiDAR. The LiDAR stores at least one instruction. The at least one instruction is capable of being executed by a processor to perform the steps of the foregoing method in the embodiments shown in FIG. 2 to FIG. 6. For a specific execution process, refer to the specific description of the embodiments shown in FIG. 2 to FIG. 6. Details are not described herein again.

Figure 12:
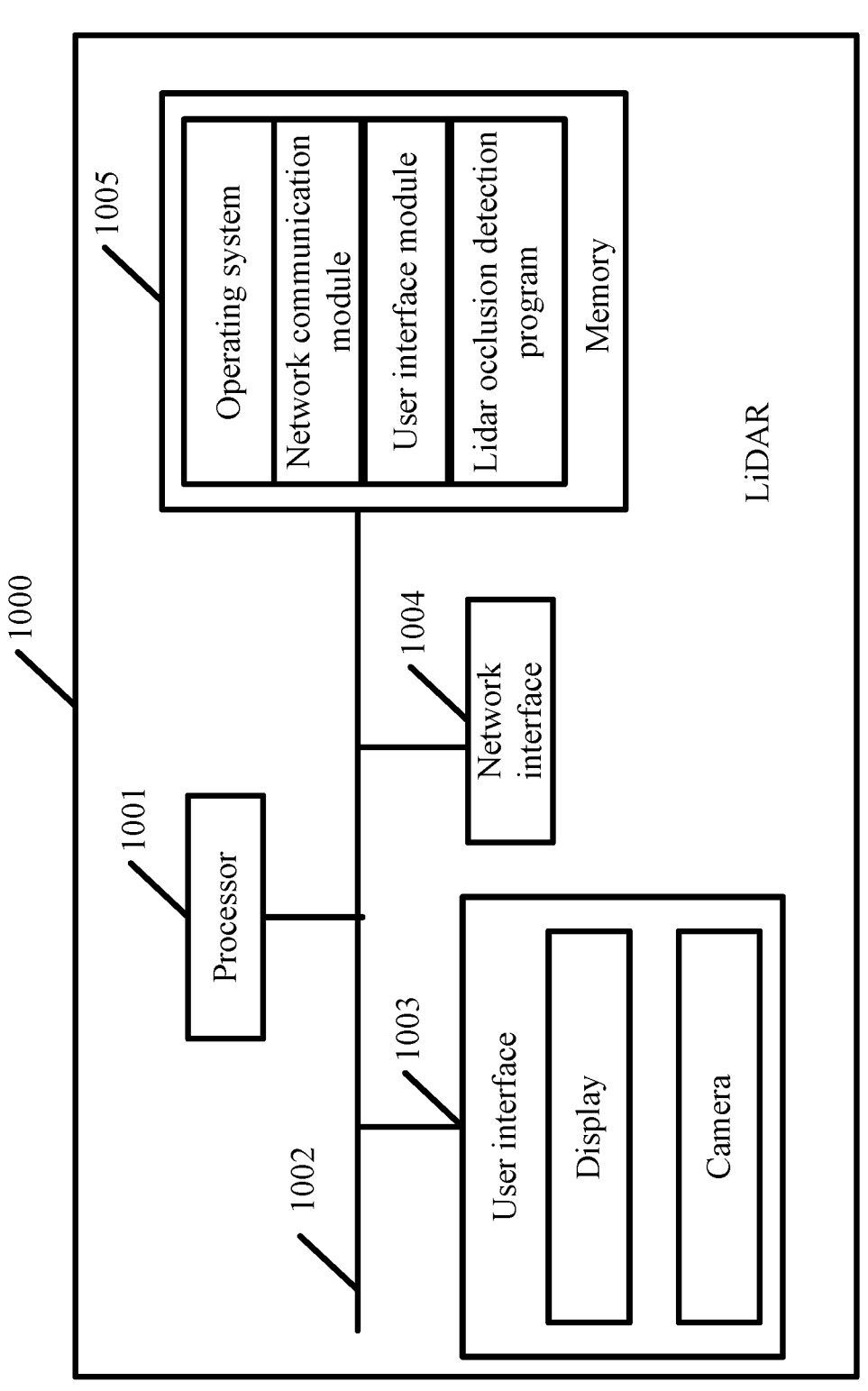
FIG. 12 is a schematic structural diagram of a LiDAR according to an embodiment of the present application.

Referring to FIG. 12, FIG. 12 is a schematic structural diagram of a LiDAR according to an embodiment of the present application. As shown in FIG. 12, LiDAR 1000 may include: at least one processor 1001, at least one network interface 1004, a user interface 1003, a memory 1005, and at least one communication bus 1002.

Herein, the communication bus 1002 is configured to implement a connection and communication between these components.

Herein, the user interface 1003 may include a display and a camera, or in some embodiments, the user interface 1003 may further include a standard wired interface and a wireless interface.

Herein, the network interface 1004 may include a standard wired interface and a wireless interface (such as a Wi-Fi interface).

Herein, the processor 1001 may include one or more processing cores. The processor 1001 uses various interfaces and lines to connect various parts of the entire LiDAR 1000, and executes various functions and processes data of the LiDAR 1000 by running or executing instructions, programs, code sets, or instruction sets stored in the memory 1005, and invoking data stored in the memory 1005. In some embodiments, the processor 1001 may be realized in at least one hardware form of digital signal processing (DSP), a field-programmable gate array (FPGA), and a programmable logic array (PLA). The processor 1001 may integrate a combination of one or more of a central processing unit (CPU), a graphics processing unit (GPU), a modem, and the like. The GPU is configured to render and draw content that needs to be displayed on a display. The modem is configured to process wireless communication. It may be understood that the forgoing modem may not be integrated into the processor 1001, and may be implemented by one chip independently.

The memory 1005 may include a random access memory (RAM), or a read-only memory (ROM). In some embodiments, the memory 1005 includes a non-transitory computer-readable medium. The memory 1005 may be configured to store instructions, programs, codes, code sets, or instruction sets. The memory 1005 may include a program storage region and a data storage region. The program storage region may store instructions for implementing the operating system, instructions for at least one function (such as a touch control function, a sound play function, and an image play function), and instructions for implementing each of the foregoing method embodiments. In some embodiments, the memory 1005 may also be at least one storage device located away from the aforementioned processor 1001. As shown in FIG. 12, as a computer storage medium, the memory 1005 may include an operating system, a network communications module, a user interface module, and a LiDAR occlusion detection application program.

In the LiDAR 1000 shown in FIG. 12, the user interface 1003 is mainly configured to provide an input interface for a user to obtain data input by the user; and the processor 1001 can be used to invoke the LiDAR occlusion detection application program stored in the memory 1005, and perform the following operations:

obtaining detected echo data;

obtaining distance information of each point in the echo data;

comparing the distance information with a preset distance range; and if the distance information is within the preset distance range, determining that the LiDAR is occluded.

In an embodiment, before obtaining the detected echo data, the processor 1001 further performs the following operations:

when the LiDAR is occluded by a reference object, obtaining a reference distance between the reference object and the LiDAR; and obtaining the preset distance range based on the reference distance.

In an embodiment, when determining that the LiDAR is occluded in the case that the distance information is within the preset distance range, the processor 1001 performs the following operations:

if distance information of each point is within the preset distance range, obtaining a plurality pieces of echo data of the point;

obtaining distance information of each point in the plurality pieces of echo data;

comparing the distance information of each point in the plurality pieces of echo data with the preset distance range; and if the distance information of each point in the plurality pieces of echo data is within the preset distance range, determining that the LiDAR is occluded.

In an embodiment, after determining that the LiDAR is occluded in the case that the distance information is within the preset distance range, the processor 1001 further performs the following operations:

obtaining the number of points whose distance information is within the preset distance range; and when the number of points within the preset distance range reaches a preset alarm value, raising a fault alarm.

In an embodiment, before obtaining the detected echo data, the processor 1001 further performs the following operations:

dividing a detection region into a general detection region and a target detection region; and setting the alarm value based on the number of points within the preset distance range in the general detection region and the target detection region.

In an embodiment, after determining that the LiDAR is occluded in the case that the distance information is within the preset distance range, the processor 1001 further performs the following operations:

calculating a ratio of the number of points within the preset distance range in the detection region to the number of all points in the detection region, and based on the ratio and different preset occlusion levels, determining a current occlusion level; and outputting the current occlusion level to a host computer, to enable the host computer to process corresponding to the current occlusion level.

In an embodiment, before obtaining the detected echo data, the processor 1001 further performs the following operations:

calculating a reference ratio of the reference number of points within the preset distance range in the detection region to the number of all points in the detection region, and based on the reference ratio, classifying different occlusion levels.

In an embodiment, when calculating the ratio of the number of points within the preset distance range in the detection region to the number of all points in the detection region, the processor 1001 performs the following operations:

calculating a ratio of the number of points within the preset distance range in the target detection region to the number of all points in the target detection region; or calculating a ratio of the number of points within the preset distance range in the general detection region to the number of all points in the general detection region; or calculating a ratio of the number of points within the preset distance range in all detection regions to the number of all points in all the detection regions.

In this embodiment of the present application, a preset distance range is set, and an alarm value is set. When the number of points within the preset distance range reaches the preset alarm value, a fault alarm is raised, to enable the host computer to process based on the case that the LiDAR is occluded. The ratio of the reference number of points within the preset distance range in the detection region to the number of all the points in the detection region is calculated, and different occlusion levels are classified based on the ratio of the reference number of points within the preset distance range in the detection region to the number of all the points in the detection region. During working, the LiDAR determines a current occlusion level based on the ratio of the number of points within the preset distance range in the detection region to the number of all the points in the detection region and different preset occlusion levels, and outputs the current occlusion level to the host computer, to enable the host computer to process corresponding to the current occlusion level. Provided that the distance information is compared with the preset distance range during normal working of the LiDAR, it can be detected in real time whether the LiDAR is occluded, without affecting transmittance of the LiDAR or increasing manufacturing costs of the LiDAR.

The person skilled in the art can understand that all or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, the read-only storage memory or the random storage memory, and so on.

The disclosed forgoing are only embodiments of the present application, which cannot be used to limit the scope of rights of the present application. Therefore, equivalent changes made in accordance with the claims of the present application still fall within the scope of the application.

What is claimed is:

1. A method for LiDAR occlusion detection, applied to a LiDAR, comprising:

when the LiDAR is occluded by a reference object, obtaining a reference distance between the reference object and the LiDAR, and obtaining a preset distance range based on the reference distance, wherein the reference distance refers to distance information of each point in echo data obtained by the LiDAR during normal working after the reference object is provided;

dividing a detection region into a general detection region and a target detection region, and setting alarm values based on a number of points within the preset distance range in the general detection region and the target detection region, wherein the target detection region is a detection region pertaining to a central region in the detection region of the LiDAR, the general detection region is a detection region other than the target detection region, and the alarm value set for the target detection region is higher than the alarm value for the general detection region;

obtaining detected echo data;

obtaining distance information of each point in the echo data;

comparing the distance information of each point in the echo data with the preset distance range;

when the distance information of any point is within the preset distance range, multiple pieces of echo data are further obtained for a region or a position in which the point is located;

if distance information of the multiple pieces of echo data of the point is within the preset distance range, determining that the LiDAR is occluded;

if only a preset proportion of the distance information of the multiple pieces of echo data is within the preset distance range, determining that the LiDAR is not occluded; and obtaining a number of points whose distance information is within the preset distance range, and raising a fault alarm when the number of points within the preset distance range reaches the preset alarm value.

2. The method of claim 1, wherein before obtaining detected echo data, the method further comprises:

calculating a reference ratio of a reference number of points within the preset distance range in a detection region to a number of all points in the detection region, and based on the reference ratio, classifying different occlusion levels.

3. The method of claim 1, wherein after determining that the LiDAR is occluded, the method further comprises:

calculating a ratio of the number of points within the preset distance range in a detection region to a number of all points in the detection region, and based on the ratio and different preset occlusion levels, determining a current occlusion level; and outputting the current occlusion level to a host computer, to enable the host computer to process corresponding to the current occlusion level.

4. The method of claim 3, wherein calculating a ratio of the number of points within the preset distance range in the detection region to the number of all points in the detection region comprises:

calculating a ratio of the number of points within the preset distance range in a target detection region to the number of all points in the target detection region; or calculating a ratio of the number of points within the preset distance range in a general detection region to the number of all points in the general detection region; or calculating a ratio of the number of points within the preset distance range in all detection regions to the number of all points in all the detection regions.

* * * * *